US012733632B2

(12) United States Patent
Xu

(10) Patent No.: US 12,733,632 B2
(45) Date of Patent: Sep. 15, 2026

(54) SNAP-ON FISH CONTROL DEVICE

(71) Applicant: Junmin Xu, Ningbo (CN)

(72) Inventor: Junmin Xu, Ningbo (CN)

( * ) Notice: Subject to any disclaimer, the term of this patent is extended or adjusted under 35 U.S.C. 154(b) by 0 days.

(21) Appl. No.: 19/082,601

(22) Filed: Mar. 18, 2025

(65) Prior Publication Data

US 2026/0060229 A1 Mar. 5, 2026

(30) Foreign Application Priority Data

Aug. 27, 2024 (CN) ......................... 202422080455.0

(51) Int. Cl.
*A01K 97/14* (2006.01)
*A01K 97/18* (2006.01)

(52) U.S. Cl.
CPC .............. *A01K 97/14* (2013.01); *A01K 97/18* (2013.01)

(58) Field of Classification Search
CPC ......... A01K 97/18; A01K 97/00; A01K 97/14
USPC ..... 43/53.5, 5, 4; 294/19.3, 115, 109, 110.1, 294/119.1, 16, 22, 100, 116
See application file for complete search history.

(56) References Cited

U.S. PATENT DOCUMENTS 406,546 A * 7/1889 Taber ..................... A01K 97/14 294/19.3
886,003 A * 4/1908 Kraft ...................... A01K 97/14 294/19.3
1,464,232 A * 8/1923 Beam ..................... G01G 19/58 177/233
1,665,661 A * 4/1928 Glessale ................ A01K 97/14 294/19.3
1,941,064 A * 12/1933 Wendt .................... A47G 21/10 119/806
2,193,073 A * 3/1940 Norton ................... A01K 97/14 294/100
2,533,230 A * 12/1950 Dixon ................. A01K 15/003 119/806
2,584,881 A * 2/1952 Johnson ................. A01K 97/14 294/19.3
2,654,632 A * 10/1953 Herbert ..................... B25B 9/00 43/53.5
3,018,579 A * 1/1962 Girden ................... A01K 81/00 43/5

(Continued)

FOREIGN PATENT DOCUMENTS

CN 203723298 U * 7/2014
CN 109769766 A * 5/2019

(Continued)

*Primary Examiner* — Darren W Ark

(57) ABSTRACT

A snap-on fish control device, comprising a tube body, a clamping component, and a control component; the control component comprises a moving shaft, a movable fastener, a lock control component, and a reset component; the movable fastener drives the moving shaft to move forward and backward to control the opening and closing of the clamping component; when the lock control component locks the moving shaft, the first hook and the second hook are closed; when the lock control component does not lock the moving shaft and under the action of the reset component, the moving shaft moves forward, and the first hook and the second hook are opened. The clamping component can be stably kept in an open state, and the fish can be quickly clamped and controlled when taking the fish from the hook.

6 Claims, 8 Drawing Sheets

(56) References Cited

U.S. PATENT DOCUMENTS

| | | | | | |
|---|---|---|---|---|---|
| 3,208,786 | A * | 9/1965 | Eddleman | B65D 25/08 294/115 |
| 3,219,376 | A * | 11/1965 | Peters | B25J 1/04 294/115 |
| 3,833,252 | A * | 9/1974 | Redding | A01K 97/14 294/100 |
| 3,978,605 | A * | 9/1976 | Maruniak | A01K 97/14 294/115 |
| 4,783,926 | A * | 11/1988 | McKinney | A01K 97/14 294/19.3 |
| 4,845,876 | A * | 7/1989 | Dodson | A01K 97/14 43/5 |
| 4,934,089 | A * | 6/1990 | Samar | A01K 97/14 294/111 |
| 5,119,585 | A * | 6/1992 | Camp | G01G 19/60 177/148 |
| 5,407,243 | A * | 4/1995 | Riemann | A61B 17/50 294/100 |
| 5,832,651 | A * | 11/1998 | Arntz | A01K 97/14 43/5 |
| 6,256,923 | B1 * | 7/2001 | Norton | A01K 97/14 81/367 |
| 6,438,891 | B1 * | 8/2002 | Aboczky | A01K 97/14 43/53.5 |
| 6,560,913 | B1 * | 5/2003 | Liao | A01K 97/14 177/148 |
| 6,571,505 | B1 * | 6/2003 | Poiencot, Jr. | A01K 97/14 43/5 |
| 6,766,609 | B1 * | 7/2004 | Aboczky | A01K 97/14 43/53.5 |
| 6,769,212 | B2 * | 8/2004 | Grayson | A01K 97/14 43/4 |
| 6,989,495 | B2 * | 1/2006 | Yang | A01K 97/14 177/148 |
| 7,076,910 | B1 * | 7/2006 | Xifra | A01K 97/14 177/148 |
| 7,478,497 | B2 * | 1/2009 | Otsuka | A01K 97/14 177/148 |
| 8,646,766 | B2 * | 2/2014 | Shrock | B25B 5/08 269/143 |
| 9,357,758 | B1 * | 6/2016 | Smith | A01K 97/14 |
| 11,484,021 | B2 * | 11/2022 | Xu | A01K 97/18 |
| 2004/0055203 | A1 * | 3/2004 | Grayson | A01K 97/14 43/4 |
| 2012/0038179 | A1 * | 2/2012 | Segovia | A62B 99/00 294/19.3 |

FOREIGN PATENT DOCUMENTS

| | | | | | |
|---|---|---|---|---|---|
| CN | 212589756 | U | * | 2/2021 | |
| CN | 214629264 | U | * | 11/2021 | |
| JP | 2014128232 | A | * | 7/2014 | |
| JP | 2025006479 | A | * | 1/2025 | A01K 97/00 |
| JP | 2025006480 | A | * | 1/2025 | A01K 97/00 |

* cited by examiner

SNAP-ON FISH CONTROL DEVICE

TECHNICAL FIELD

The invention relates to the field of fish control devices, and in particular to a snap-on fish control device.

BACKGROUND ART

When anglers use fishing rods to fish, they need to take the caught fish off the fishing rods. Fish control devices are widely used in modern fishing activities. Their function is to prevent anglers' hands from being scratched by fish teeth, fish bones, fish hooks, etc. when taking fish, and to reduce damage to fish.

The clamping mechanism of the fish control devices currently on the market is often kept in a closed state when not in use. When taking a fish from a fishhook, the clamping mechanism of the existing fish control devices is often opened, and then the fish's mouth is clamped to control the fish. In this process, it is necessary to first operate the step of opening the clamping mechanism, which is difficult to control in actual operation, resulting in a poor user experience.

Therefore, there is a need for a fish control device that can stably keep the clamping mechanism in an open state before controlling the fish during fishing.

SUMMARY OF THE INVENTION

The technical problem to be solved by the invention is to overcome the defects of the above technology and provide a snap-on fish control device.

A snap-on fish control device, comprising:

a tube body, a front end of which is fixed with a first fixed shaft and a plurality of clearance openings;

a clamping component, which comprises a first hook and a second hook that are both provided with a neck of hook, and the two necks of hook are both provided with a sliding groove;

a clamping component, which comprises a first hook and a second hook that are both provided with a neck of hook, and the two necks of hook are both provided with a sliding groove;

the first fixed shaft passes through the two first strip holes and the two sliding grooves at the same time, and the clearance openings are used for the clearance of the position change of the two necks of hook;

the movable fastener drives the moving shaft to move forward and backward to control the opening and closing of the first hook and the second hook; when the lock control component locks the moving shaft, the first hook and the second hook are closed; when the lock control component does not lock the moving shaft and under the action of the reset component, the moving shaft moves forward, and the first hook and the second hook are opened.

Further, the tube body is provided with a second strip hole inside the movable fastener, and the moving shaft is provided with a second fixed shaft passing through the second strip hole; the second fixed shaft is fixedly connected to the movable fastener.

Further, the lock control component comprises a lock piece sleeved on the tube body and located behind the movable fastener, a fixed sleeve sleeved on the tube body and located behind the lock piece, and buckle beads; a first spring sleeved on the tube body is provided between the lock piece and the fixed sleeve;

the tube body is provided with a buckle hole at an inner side of the lock piece, and the buckle beads are arranged in the buckle hole and can move toward the outer side of the tube body but cannot move toward an inner side of the tube body; an inner wall of the lock piece is provided with a clearance arc groove for making way for the buckle beads to move;

a tail end of the moving shaft is provided with a conical piece, and a tilting platform is provided between the conical piece and the moving shaft; the moving shaft moves so that one buckle bead is arranged at the tilting platform to lock the moving shaft;

the movable fastener is provided with a blocking ring close to the lock piece end to prevent the buckle beads from escaping from the clearance arc groove.

Further, the tube body is coaxially provided with a sliding piece behind the conical piece, and the tube body is provided with a third fixed shaft located at the sliding piece; an outer wall of the sliding piece is provided with a third strip hole, and the third fixed shaft is arranged in the third strip hole; a second spring is provided at a tail end of the sliding piece and an inner wall of the tube body.

Further, a tail end of the tube body is threaded with a blocking block; the second spring is arranged between the sliding piece and the blocking block, and one end of the blocking block away from the tube body is provided with a retaining ring; the fixed sleeve is arranged between the retaining ring and the lock piece.

Further, a tail end of the tube body is threaded with a blocking block; the second spring is arranged between the sliding piece and the blocking block, and one end of the blocking block away from the tube body is provided with a retaining ring; the fixed sleeve is arranged between the retaining ring and the lock piece.

Further, the blocking cap is provided with a connecting ring.

Advantages of the invention: the invention has a reasonable structure and is easy to operate. During fishing and before controlling the fish, the clamping component can be stably kept in an open state, and the fish can be quickly clamped and controlled when taking the fish from the hook, thereby improving the fish controlling experience of the angler;

when the lock control component locks the moving shaft, the first hook and the second hook are closed;

when the lock control component does not lock the moving shaft and under the action of the reset component, the moving shaft moves forward, and the first hook and the second hook are opened.

Figure 1:
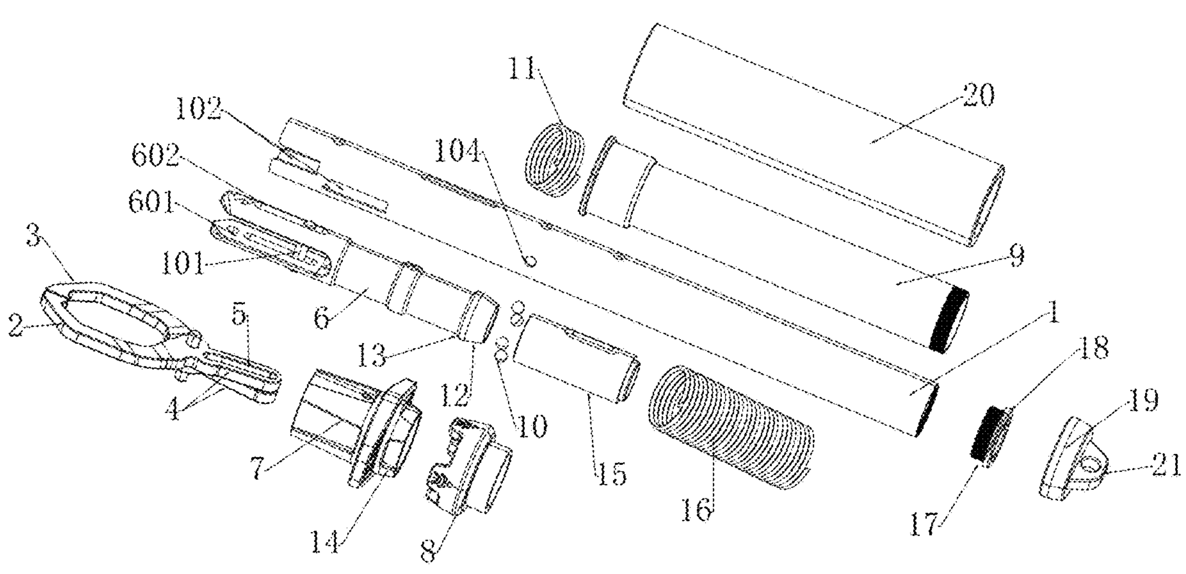
FIG. 1 is an exploded schematic diagram of the snap-on fish control device according to the invention.
Figure 2:
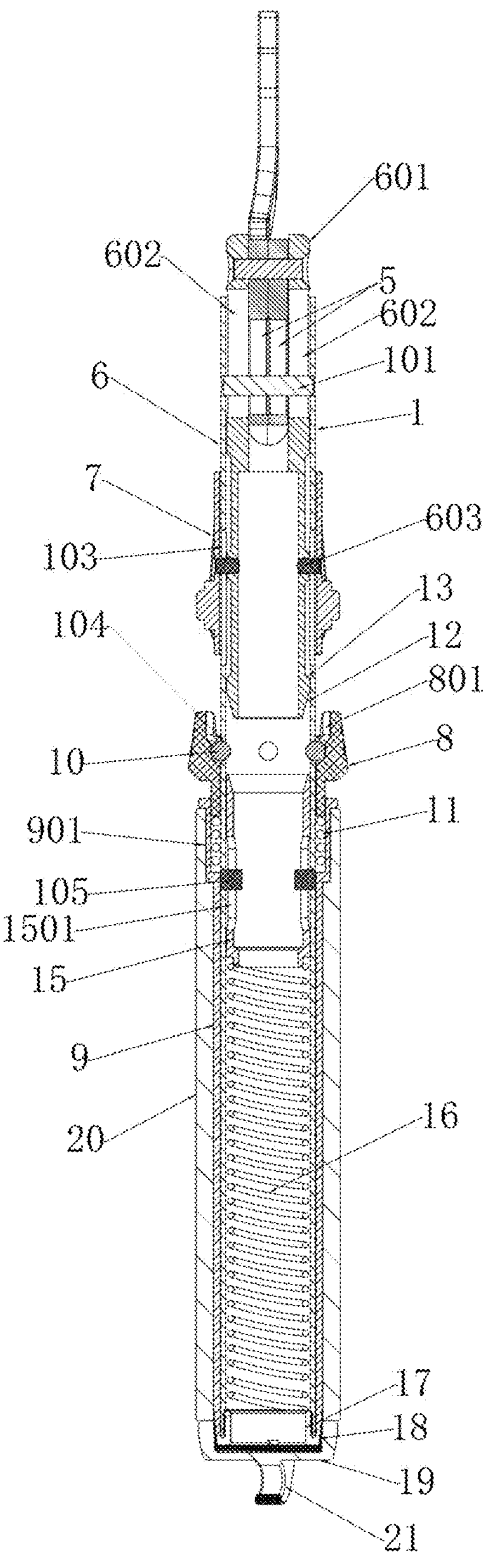
FIG. 2 is a schematic overall cross-sectional view of the snap-on fish control device according to the invention.
Figure 3:
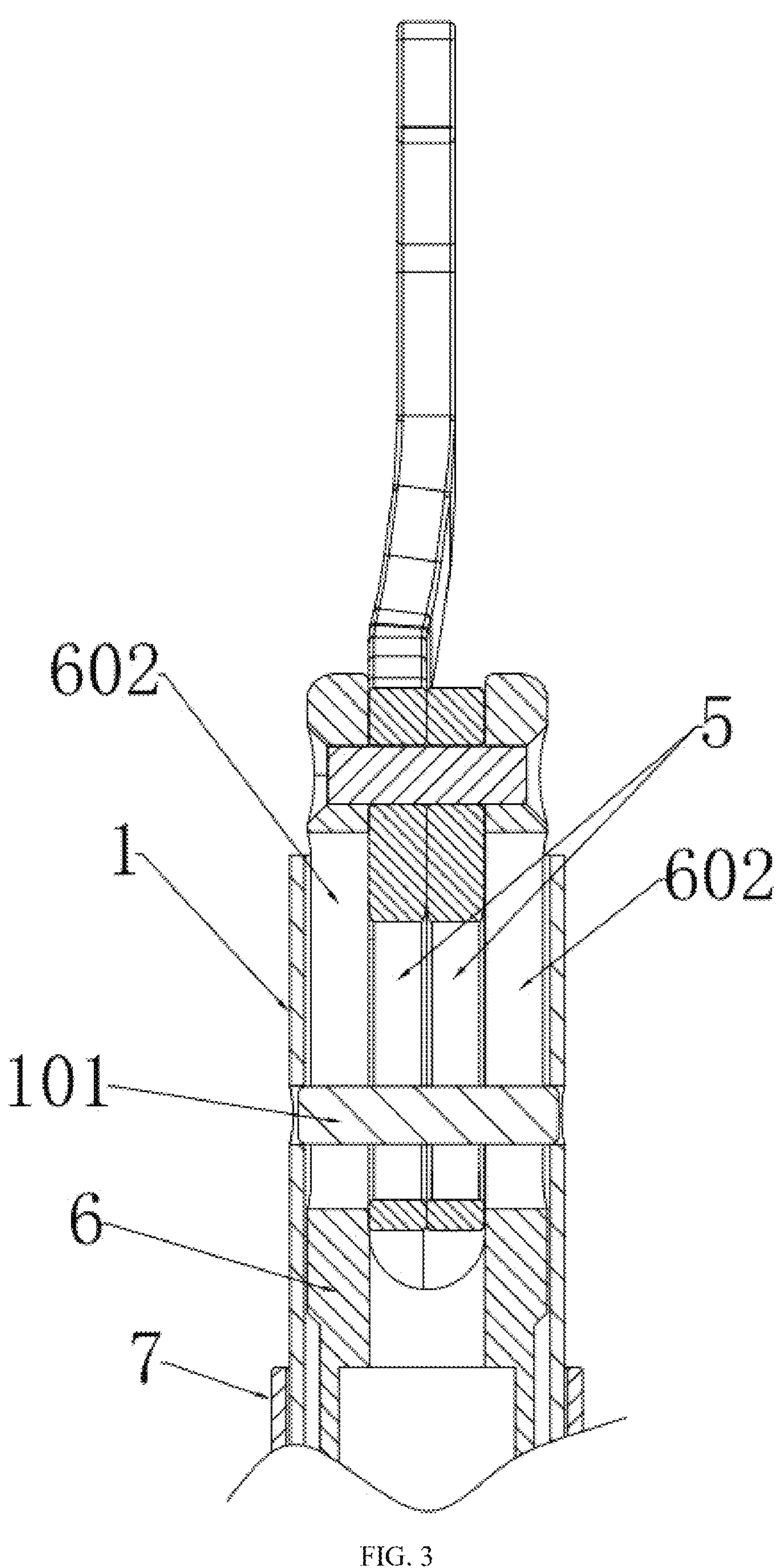
FIG. 3 is a schematic partial cross-sectional view of the clamping component, the tube body, and the moving shaft in the snap-on fish control device according to the invention.
Figure 4:
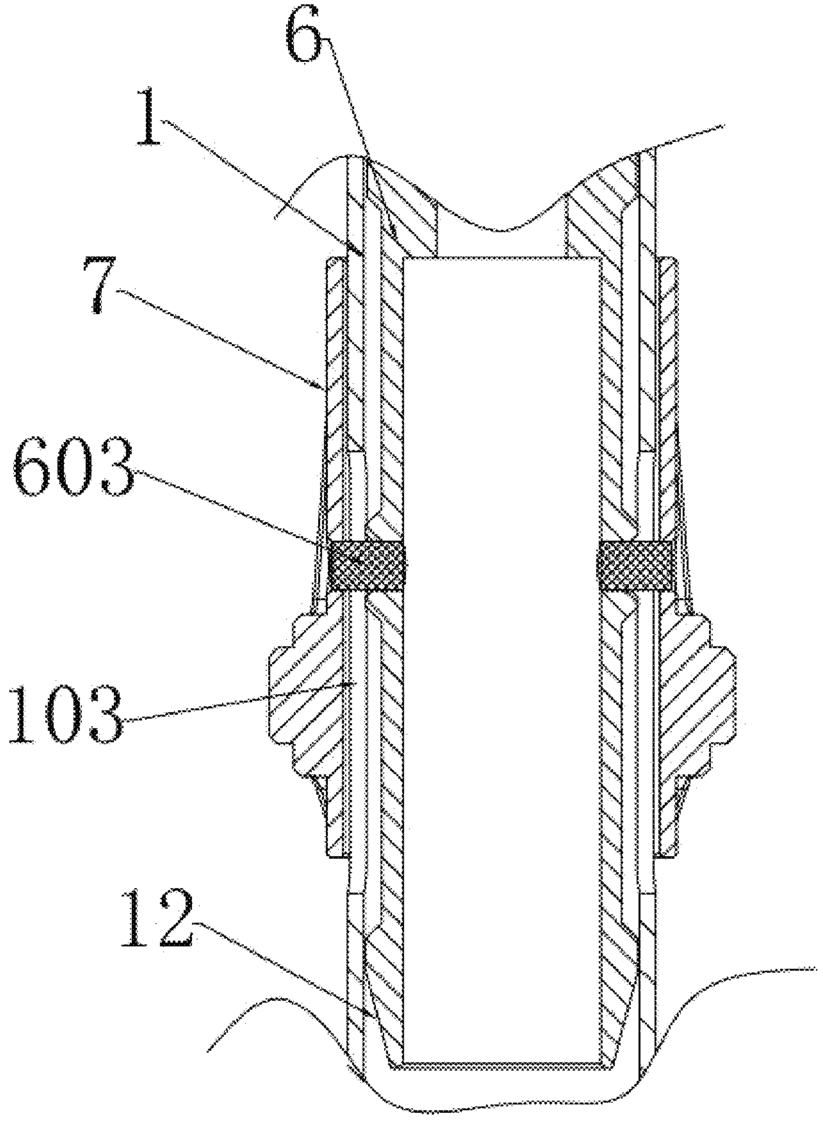
FIG. 4 is a schematic partial cross-sectional view of the moving shaft, the tube body, and the movable fastener in the snap-on fish control device according to the invention.
Figure 5:
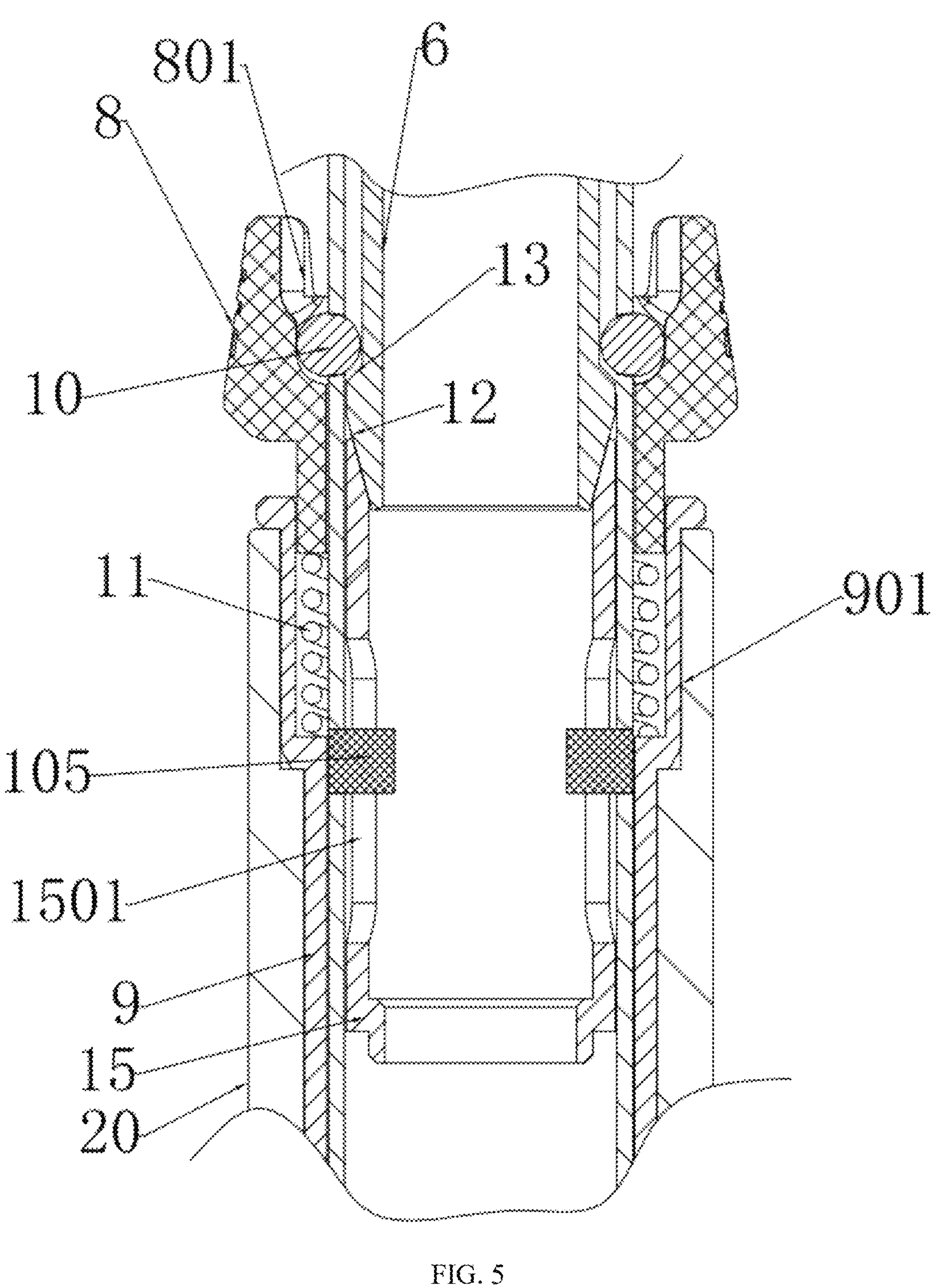
FIG. 5 is a schematic partial cross-sectional view of the moving shaft, the tube body, the lock piece, and the sliding piece in the snap-on fish control device according to the invention.
Figure 6:
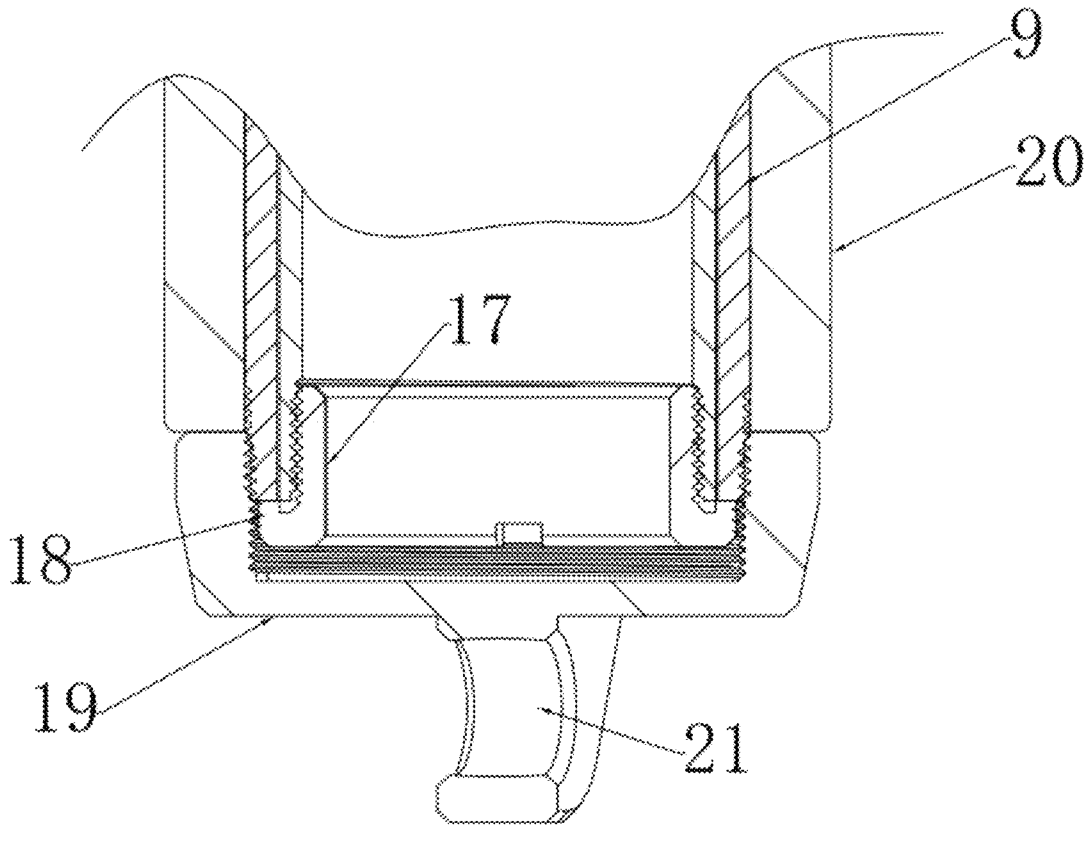
FIG. 6 is a schematic partial cross-sectional view of the tail end of the tube body in the snap-on fish control device according to the invention.
Figure 7:
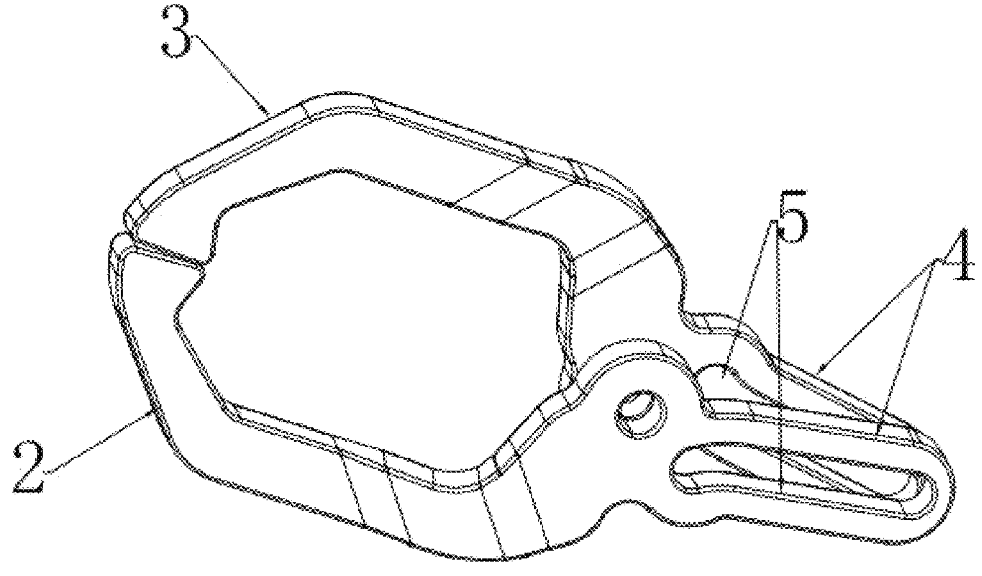
FIG. 7 is a schematic diagram of the first hook and the second hook in the snap-on fish control device according to the invention.
Figure 8:
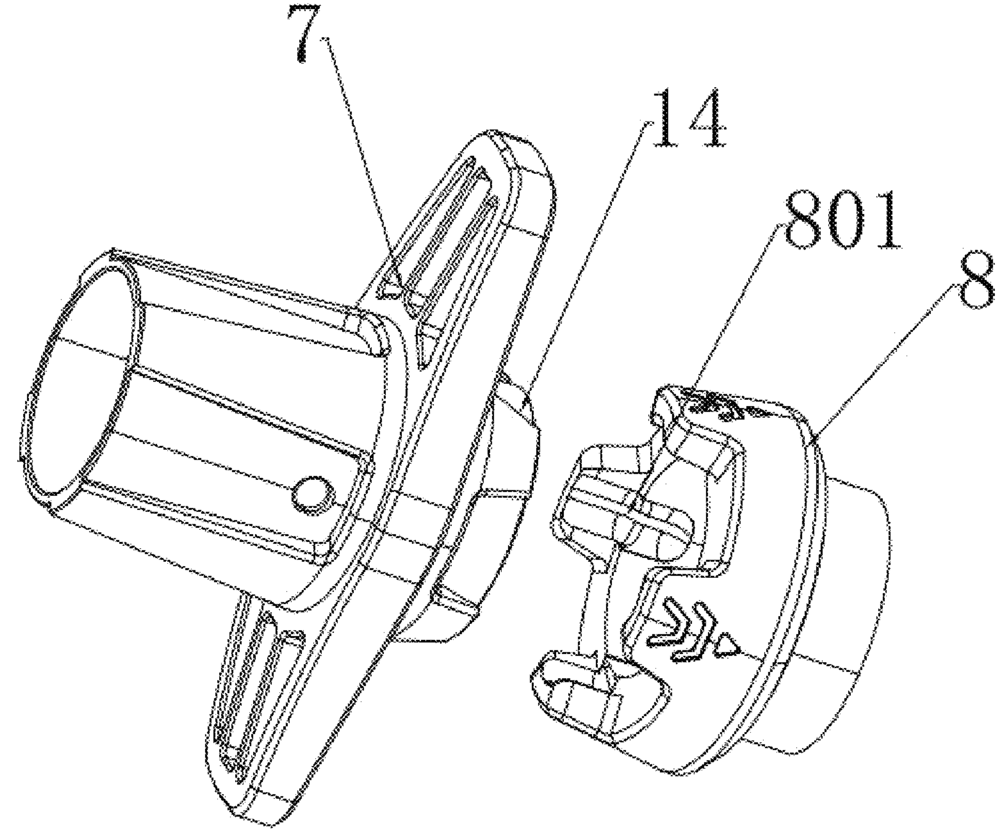
FIG. 8 is a three-dimensional schematic diagram of the movable fastener and the lock piece in the snap-on fish control device according to the invention.

As shown in the figures: 1 refers to the tube body; 2 refers to the first hook; 3 refers to the second hook; 4 refers to the neck of hook; 5 refers to the sliding groove; 6 refers to the moving shaft; 7 refers to the movable fastener; 8 refers to the lock piece; 9 refers to the fixed sleeve; 10 refers to the buckle bead; 11 refers to the first spring; 12 refers to the conical piece; 13 refers to the tilting platform; 14 refers to the blocking ring; 15 refers to the sliding piece; 16 refers to the second spring; 17 refers to the blocking block; 18 refers to the retaining ring; 19 refers to the blocking cap; 20 refers to the handle tube; 21 refers to the connecting ring; 101 refers to the first fixed shaft; 102 refers to the clearance opening; 103 refers to the second strip hole; 104 refers to the buckle hole; 105 refers to the third fixed shaft; 601 refers to the U-shaped piece; 602 refers to the first strip hole; 603 refers to the second fixed shaft; 801 refers to the clearance arc groove; 901 refers to the thickened part; 1501 refers to the third strip hole.

SPECIFIC EMBODIMENT OF THE INVENTION

In the description of the invention, it should be understood that the orientation or positional relationship indicated by the terms “center”, “longitudinal”, “transverse”, “length”, “width”, “thickness”, “upper”, “lower”, “front”, “back”, “left”, “right”, “vertical”, “horizontal”, “top”, “bottom”, “inner”, “outer”, “clockwise”, “counterclockwise” etc. are based on the orientation or positional relationship shown in the drawings, and is only for the convenience of describing the invention and simplifying the description, but not indicate or imply that the pointed device or element must have a specific orientation, be constructed and operated in a specific orientation, and therefore cannot be understood as a limitation of the invention.

In addition, the terms “first” and “second” are only used for descriptive purposes, and cannot be understood as indicating or implying relative importance or implicitly indicating the number of indicated technical features. Thus, the features defined with “first” and “second” may explicitly or implicitly include one or more of these features. In the description of the invention, unless otherwise clearly defined, “plurality” means two or more.

In the description of the embodiments of the invention, if a feature is referred to as being “provided”, “fixed”, “connected” or “installed” on another feature, it may be directly provided, fixed, connected to another feature, or indirectly provided, fixed, connected, or installed on another feature.

In the description of the embodiments of the invention, if “several” is involved, it means more than one, if “multiple” is involved, it means more than two, if “greater than”, “less than” or “exceed” is involved, it should be understood as not including the number itself, if “above”, “below” or “within” is involved, it should be understood as including the number itself. If “first” or “second” is involved, it should be understood as being used to distinguish technical features, and cannot be understood as indicating or implying relative importance or implicitly indicating the number of the indicated technical features or implicitly indicating the order of the indicated technical features.

The invention will be further described in detail hereinafter with reference to the drawings.

A snap-on fish control device, comprising:

a tube body 1, a front end of which is fixed with a first fixed shaft 101 and a plurality of clearance openings 102;

a clamping component, which comprises a first hook 2 and a second hook 3 that are both provided with a neck of hook 4, and the two necks of hook 4 are both provided with a sliding groove 5;

a control component, which comprises a moving shaft 6 arranged at a front end of an inner part of the tube body 1, a movable fastener 7 sleeved on an outer side of the tube body 1 to control the movement of the moving shaft 6, a lock control component for locking the moving shaft 6, and a reset component for resetting the moving shaft 6; a front end of the moving shaft 6 is provided with a U-shaped piece 601, both side walls of which are provided with a first strip hole 602; the two necks of hook 4 are arranged between two side walls of the U-shaped piece 601, and a front end of a side wall of the U-shaped piece 601 is hinged to a front end of each neck of hook 4;

the first fixed shaft 101 passes through the two first strip holes 602 and the two sliding grooves 5 at the same time, and the clearance openings 102 are used for the clearance of the position change of the two necks of hook 4;

the movable fastener 7 drives the moving shaft 6 to move forward and backward to control the opening and closing of the first hook 2 and the second hook 3; when the lock control component locks the moving shaft 6, the first hook 2 and the second hook 3 are closed; when the lock control component does not lock the moving shaft 6 and under the action of the reset component, the moving shaft 6 moves forward, and the first hook 2 and the second hook 3 are opened.

The tube body 1 is provided with a second strip hole 103 inside the movable fastener 7, and the moving shaft 6 is provided with a second fixed shaft 603 passing through the second strip hole 103; the second fixed shaft 603 is fixedly connected to the movable fastener 7.

The lock control component comprises a lock piece 8 sleeved on the tube body 1 and located behind the movable fastener 7, a fixed sleeve 9 sleeved on the tube body 1 and located behind the lock piece 8, and buckle beads 10; a first spring 11 sleeved on the tube body 1 is provided between the lock piece 8 and the fixed sleeve 9;

the tube body 1 is provided with a buckle hole 104 at an inner side of the lock piece 8, and the buckle beads 10 are arranged in the buckle hole 104 and can move toward the outer side of the tube body 1 but cannot move toward an inner side of the tube body 1; an inner wall of the lock piece 8 is provided with a clearance arc groove 801 for making way for the buckle beads 10 to move;

a tail end of the moving shaft 6 is provided with a conical piece 12, and a tilting platform 13 is provided between the conical piece 12 and the moving shaft 6; the moving shaft 6 moves so that one buckle bead 10 is arranged at the tilting platform 13 to lock the moving shaft 6;

the movable fastener 7 is provided with a blocking ring 14 close to the lock piece 8 end to prevent the buckle beads 10 from escaping from the clearance arc groove 801.

The tube body 1 is coaxially provided with a sliding piece 15 behind the conical piece 12, and the tube body 1 is provided with a third fixed shaft 105 located at the sliding piece 15; an outer wall of the sliding piece 15 is provided with a third strip hole 1501, and the third fixed shaft 105 is arranged in the third strip hole 1501; a second spring 16 is provided at a tail end of the sliding piece 15 and an inner wall of the tube body 1.

A tail end of the tube body 1 is threaded with a blocking block 17; the second spring 16 is arranged between the sliding piece 15 and the blocking block 17, and one end of the blocking block 17 away from the tube body 1 is provided with a retaining ring 18; the fixed sleeve 9 is arranged between the retaining ring 18 and the lock piece 8.

A tail end of the fixed sleeve 9 is threaded with a blocking cap 19, and one end of the fixed sleeve 9 close to the lock piece 8 is provided with a thickened part 901; a handle tube 20 is provided on an outside of the fixed sleeve 9 between the thickened part 901 and the blocking cap 19.

The blocking cap 19 is provided with a connecting ring 21.

In specific use, the invention is mainly divided into two stages: the clamping component opening control and the clamping component closing control, as follows.

Clamping component opening control: the movable fastener 7 is controlled to drive the moving shaft 6 to move toward the rear end of the tube body 1. When the conical piece 12 reaches the position of the buckle bead 10, the buckle bead 10 will be pushed outward from the tube body, prompting the lock piece 8 to move backward. At this time, the position of the buckle bead 10 in the clearance arc groove 801 changes, and the first spring 11 is compressed. When the tilting platform 13 reaches the buckle hole 104, the buckle bead 10 is reset, the lock piece 8 is reset, and the moving shaft 6 is locked in this position. The movement of the moving shaft 6 drives the sliding piece 15 to move, the second spring 16 is compressed, and the moving shaft 6 moves backward. Through the action of the sliding piece 5, the first strip hole 602 and the first fixed shaft 101, the first hook 2 and the second hook 3 are opened. Since the moving shaft 6 is locked by the lock piece 8, the clamping component is always in the open state;

when the movable fastener 7 moves, the blocking ring 14 thereon will block the clearance arc groove 801 on the lock piece 8 to prevent the buckle bead 10 from rolling out.

Clamping component closing control: that is, when controlling the fish, the opened first hook 2 and the second hook 3 are placed at the fish's mouth, one hand holds the handle tube 20, and the movable fastener 7 is pushed forward with a finger such as the thumb. Under the action of external force, the moving shaft 6 moves toward the front end, and the buckle bead 10 changes from the position of the tilting platform 13 to the rear of the conical piece 12. Under the action of the second spring 16, the sliding piece 15 always contacts the conical piece 12 at the tail end of the moving shaft 6, keeping the moving shaft 6 at the front end of the tube body 1. At this time, the first hook 2 and the second hook 3 are closed, and the clamping component is always in a closed state.

The contents not described in detail in this specification belong to the prior art known to those skilled in the art.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

What is claimed is:

1. A snap-on fish control device, comprising:

a tube body, a front end of which is fixed with a first fixed shaft and a plurality of clearance openings;

a clamping component, which comprises a first hook and a second hook that are both provided with a neck of hook, and the two necks of hook are both provided with a sliding groove;

a control component, which comprises a moving shaft arranged at the front end of an inner part of the tube body, a movable fastener sleeved on an outer side of the tube body to control a movement of the moving shaft, a lock control component for locking the moving shaft, and a reset component for resetting the moving shaft; a front end of the moving shaft is provided with a U-shaped piece, both side walls of which are provided with a first strip hole; the two necks of hook are arranged between the both side walls of the U-shaped piece, and a front end of each side wall of the U-shaped piece is hinged to a front end of each neck of hook;

the first fixed shaft passes through the two first strip holes and the two sliding grooves at the same time, and the clearance openings are used for a clearance of a position change of the two necks of hook;

the movable fastener drives the moving shaft to move forward and backward to control the opening and closing of the first hook and the second hook; when the lock component locks the moving shaft, the first hook and the second hook are closed; when the lock control component does not lock the moving shaft and under an action of the reset component, the moving shaft moves forward, and the first hook and the second hook are opened;

wherein the tube body is provided with a second strip hole inside the movable fastener, and the moving shaft is provided with a second fixed shaft passing through the second strip hole;

the second fixed shaft is fixedly connected to the movable fastener.

2. The snap-on fish control device of claim 1, wherein the lock control component comprises a lock piece sleeved on the tube body and located behind the movable fastener, a fixed sleeve sleeved on the tube body and located behind the lock piece, and buckle beads; a first spring sleeved on the tube body is provided between the lock piece and the fixed sleeve;

the tube body is provided with a buckle hole at an inner side of the lock piece, and the buckle beads are arranged in the buckle hole and can move toward the outer side of the tube body but cannot move toward an inner side of the tube body; an inner wall of the lock piece is provided with a clearance arc groove for making way for the buckle beads to move;

a tail end of the moving shaft is provided with a conical piece, and a tilting platform is provided between the conical piece and the front end of the moving shaft; the moving shaft moves so that one of the buckle beads is arranged at the tilting platform to lock the moving shaft;

the movable fastener is provided with a blocking ring close to a front end of the lock piece to prevent the buckle beads from escaping from the clearance arc groove.

3. The snap-on fish control device of claim 2, wherein the tube body is coaxially provided with a sliding piece behind the conical piece, and the tube body is provided with a third fixed shaft located at the sliding piece; an outer wall of the sliding piece is provided with a third strip hole, and the third fixed shaft is arranged in the third strip hole; a second spring is provided at a tail end of the sliding piece and an inner wall of the tube body.

4. The snap-on fish control device of claim 3, wherein a tail end of the tube body is threaded with a blocking block; the second spring is arranged between the sliding piece and the blocking block, and one end of the blocking block away from the tube body is provided with a retaining ring; the fixed sleeve is arranged between the retaining ring and the lock piece.

5. The snap-on fish control device of claim 4, wherein a tail end of the fixed sleeve is threaded with a blocking cap, and one another end of the fixed sleeve close to the lock piece is provided with a thickened part; a handle tube is provided on an outside of the fixed sleeve between the thickened part and the blocking cap.

6. The snap-on fish control device of claim 5, wherein the blocking cap is provided with a connecting ring.

* * * * *